July 17, 1934.    R. H. SCHULTZ ET AL    1,966,525
AUTOMATIC REWINDING MACHINE
Filed June 21, 1929    12 Sheets-Sheet 1
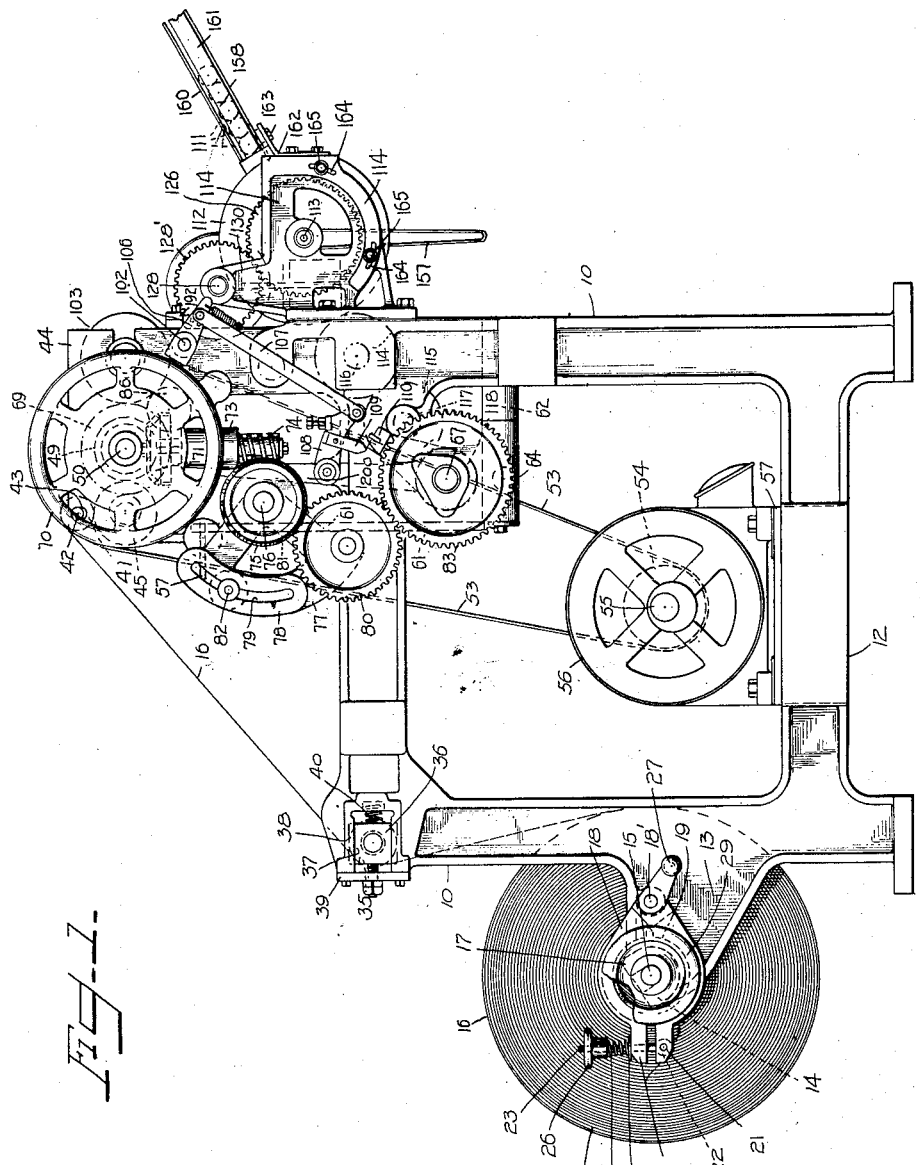
Rudolph Henry Schultz
Adam James Siebert
Leopold Charles Borlo3
INVENTORS
BY
their ATTORNEY

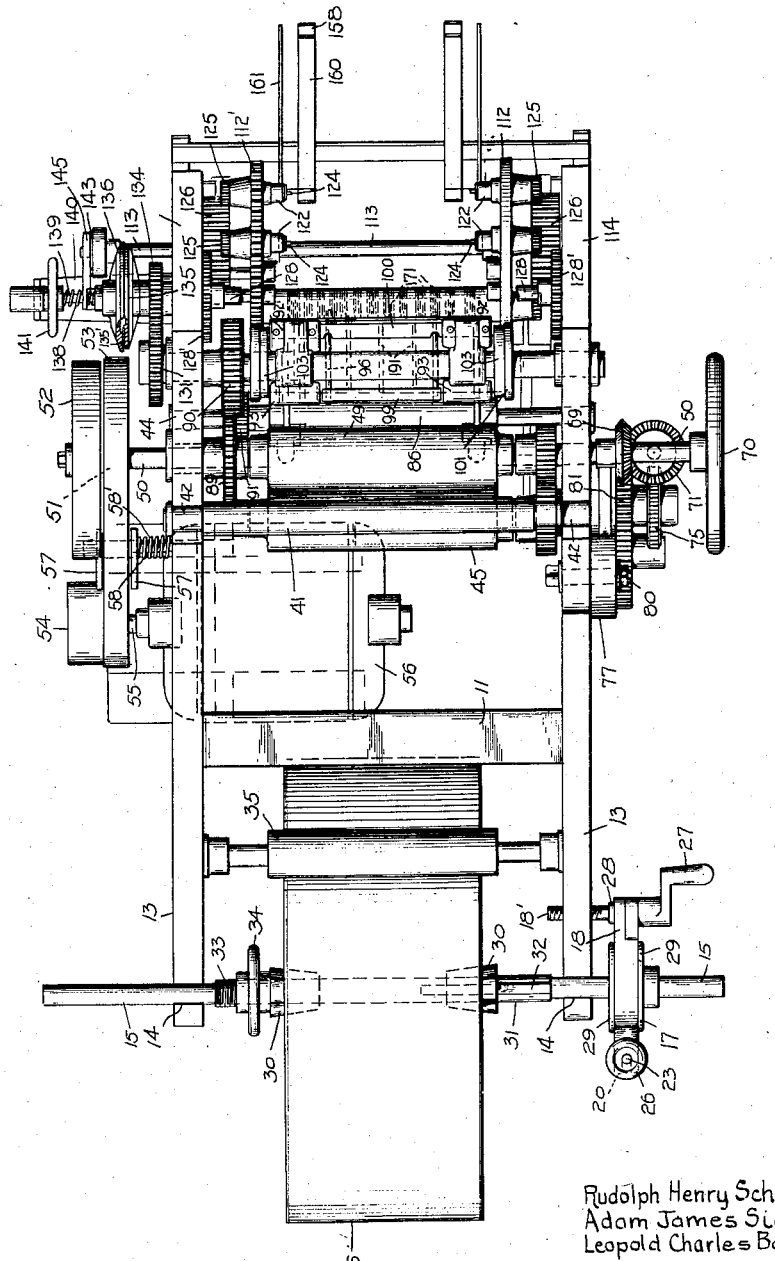

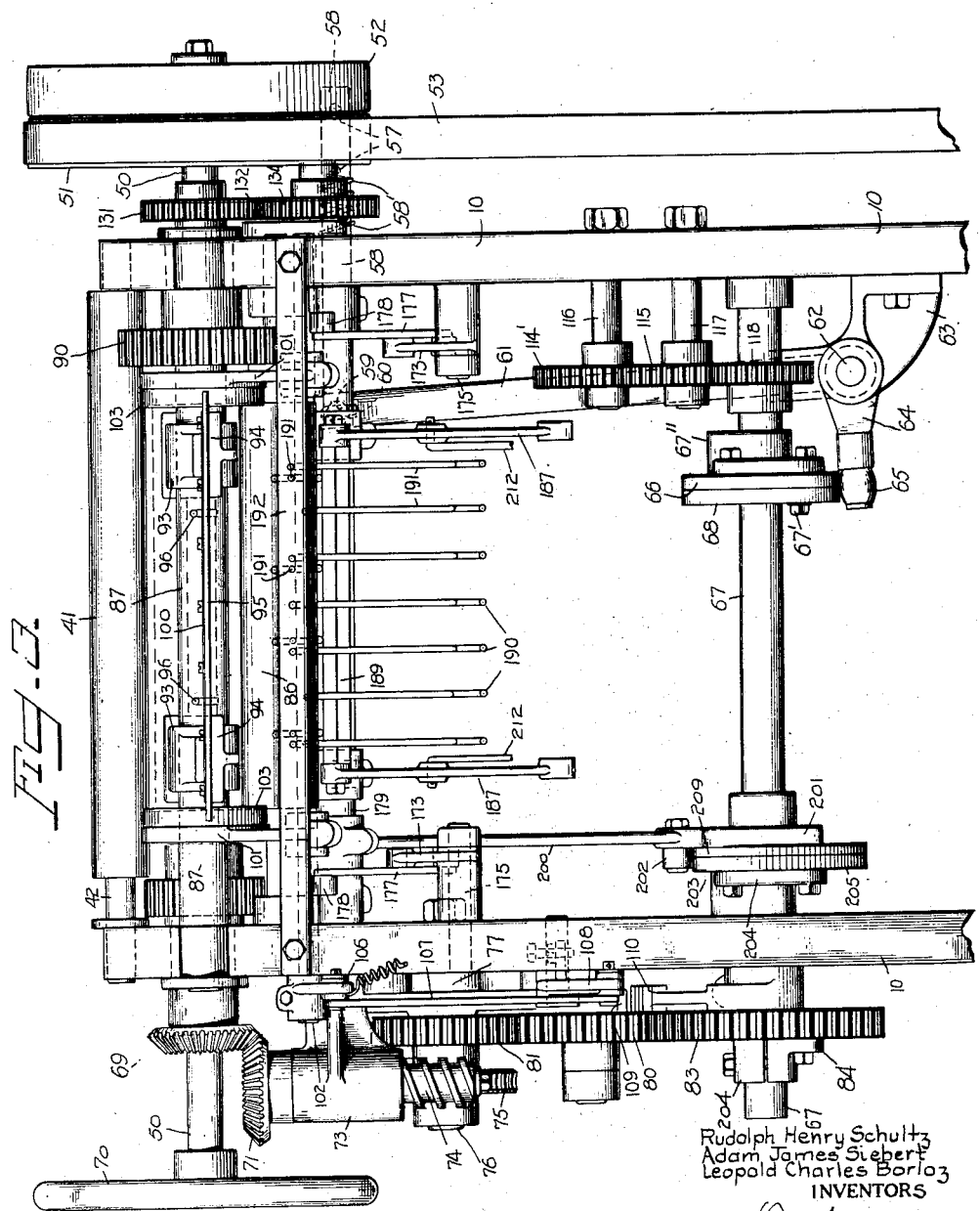

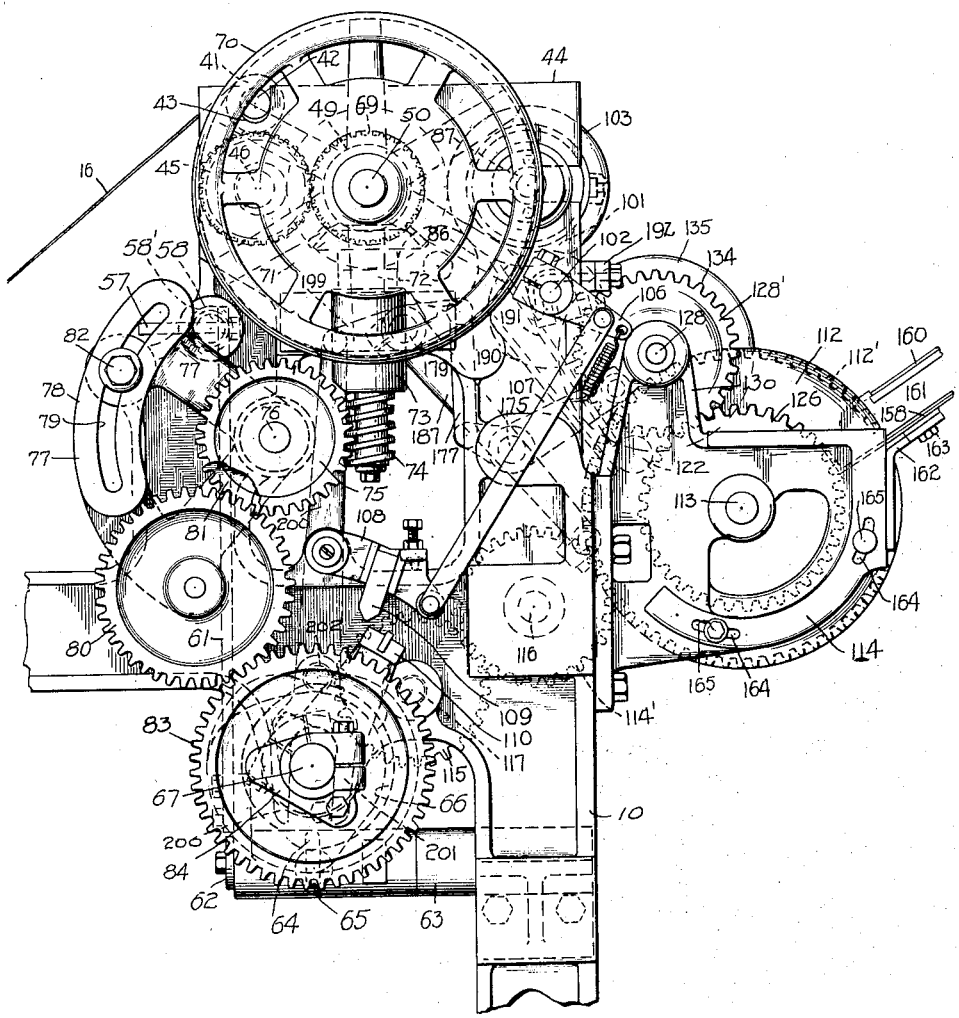

July 17, 1934. R. H. SCHULTZ ET AL 1,966,525
AUTOMATIC REWINDING MACHINE
Filed June 21, 1929  12 Sheets-Sheet 5
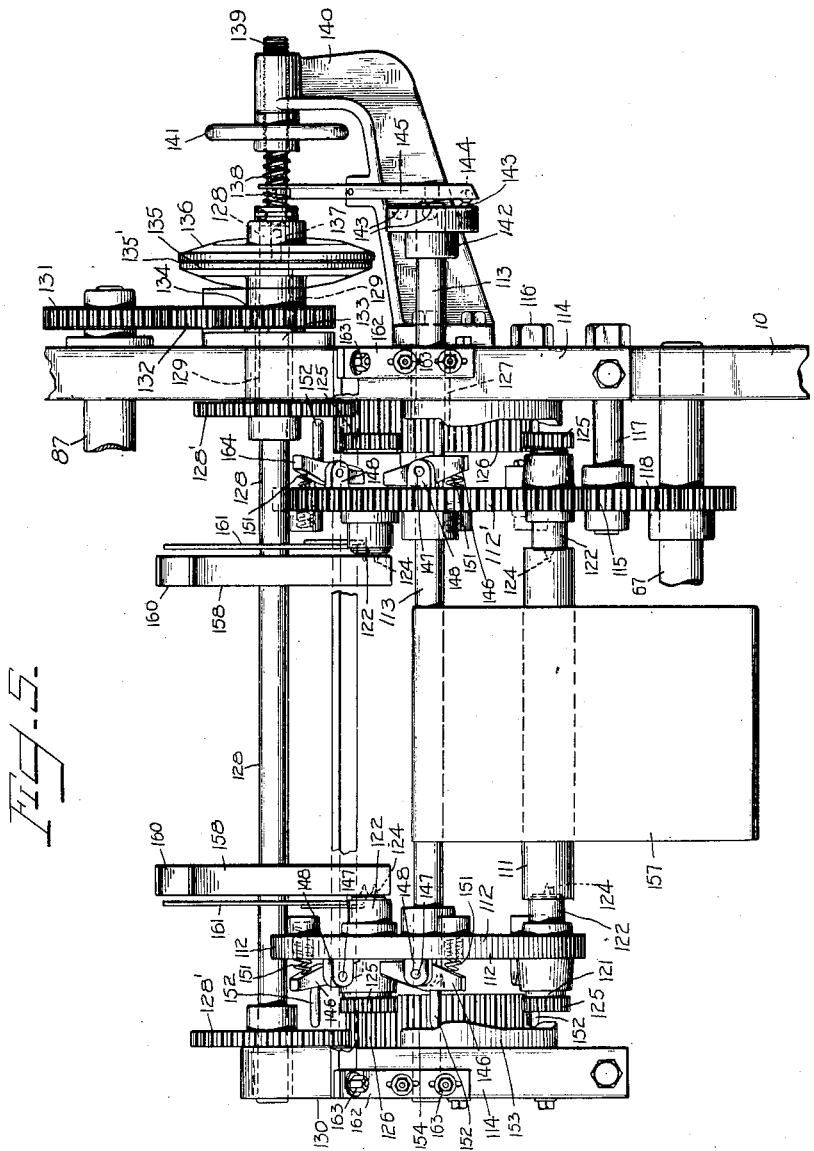
Rudolph Henry Schultz,
Adam James Siebert,
Leopold Charles Borlo,
INVENTORS
BY
their ATTORNEY.

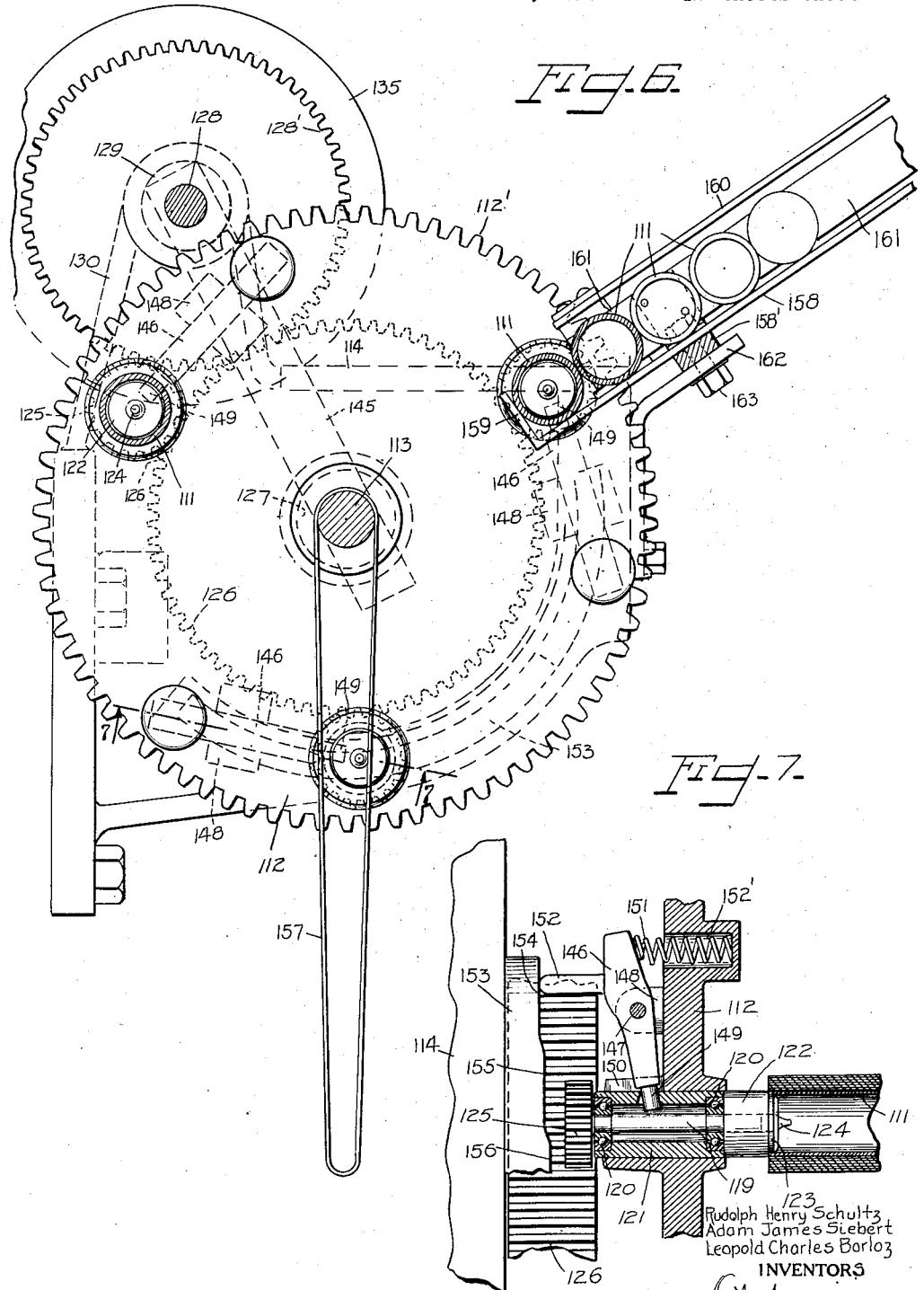

July 17, 1934.   R. H. SCHULTZ ET AL   1,966,525
AUTOMATIC REWINDING MACHINE
Filed June 21, 1929   12 Sheets-Sheet 7
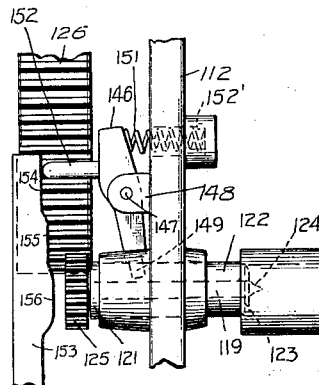
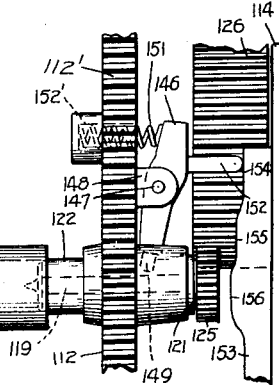
Fig. 8.
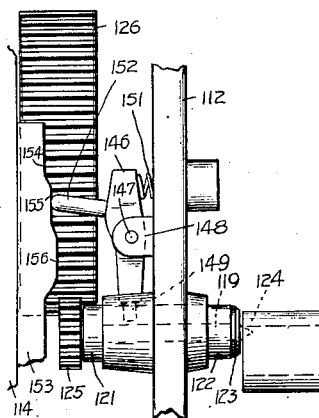
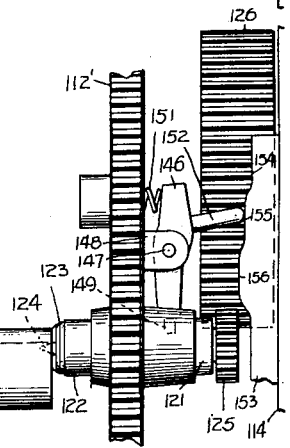
Fig. 9.
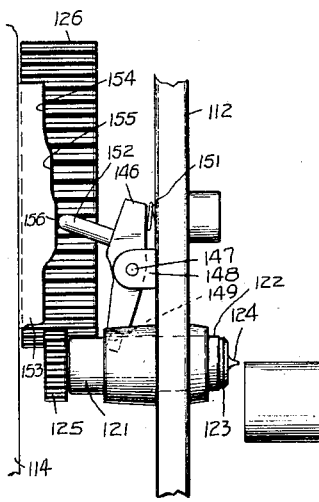
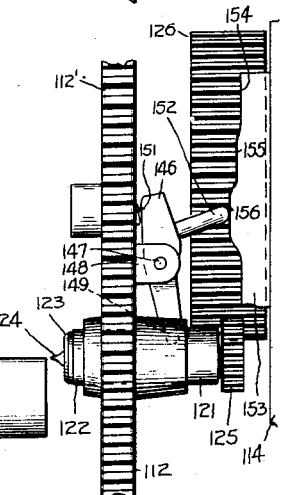
Fig. 10.
Rudolph Henry Schultz
Adam James Siebert
Leopold Charles Borlon
INVENTORS
BY
their ATTORNEY

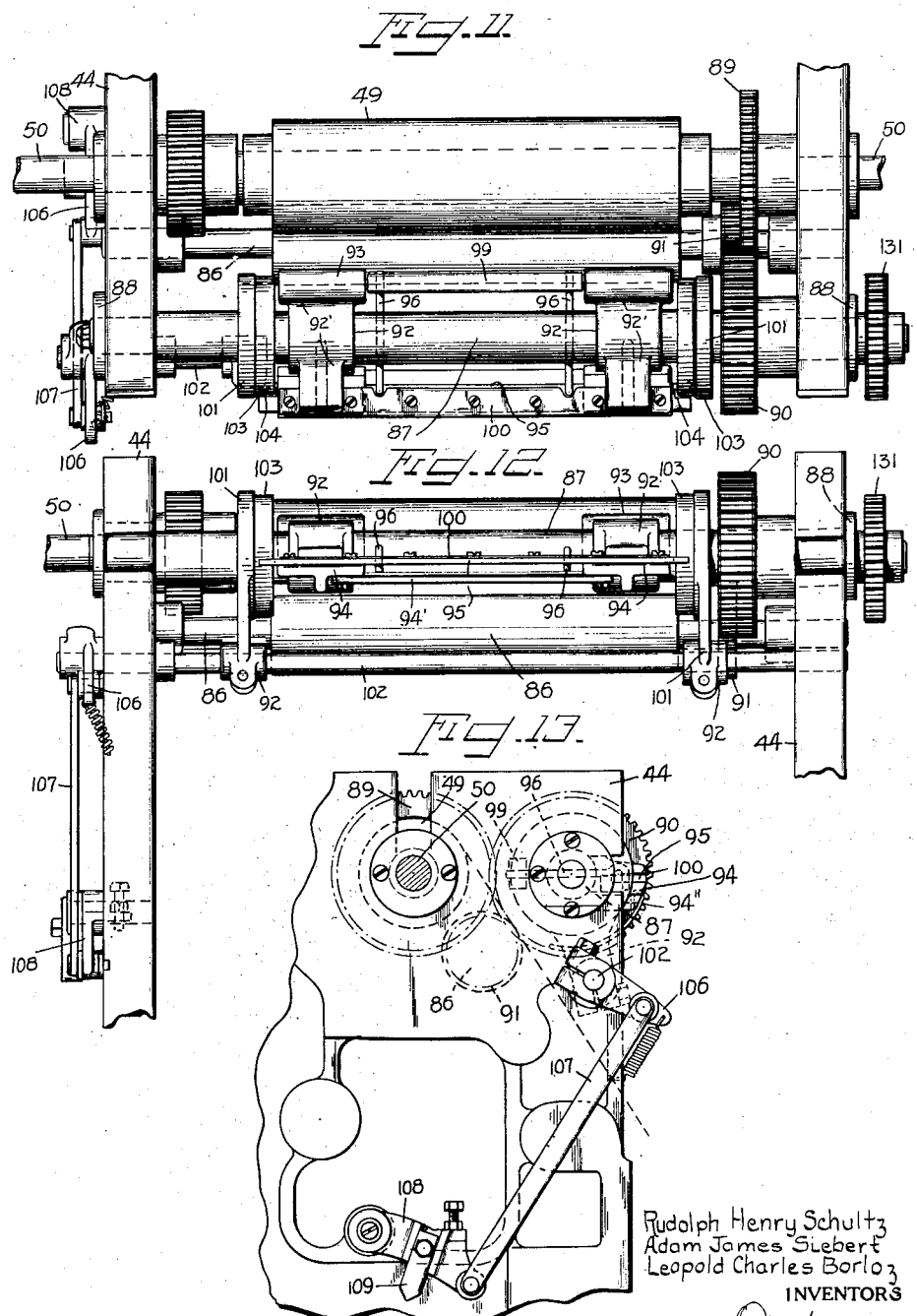

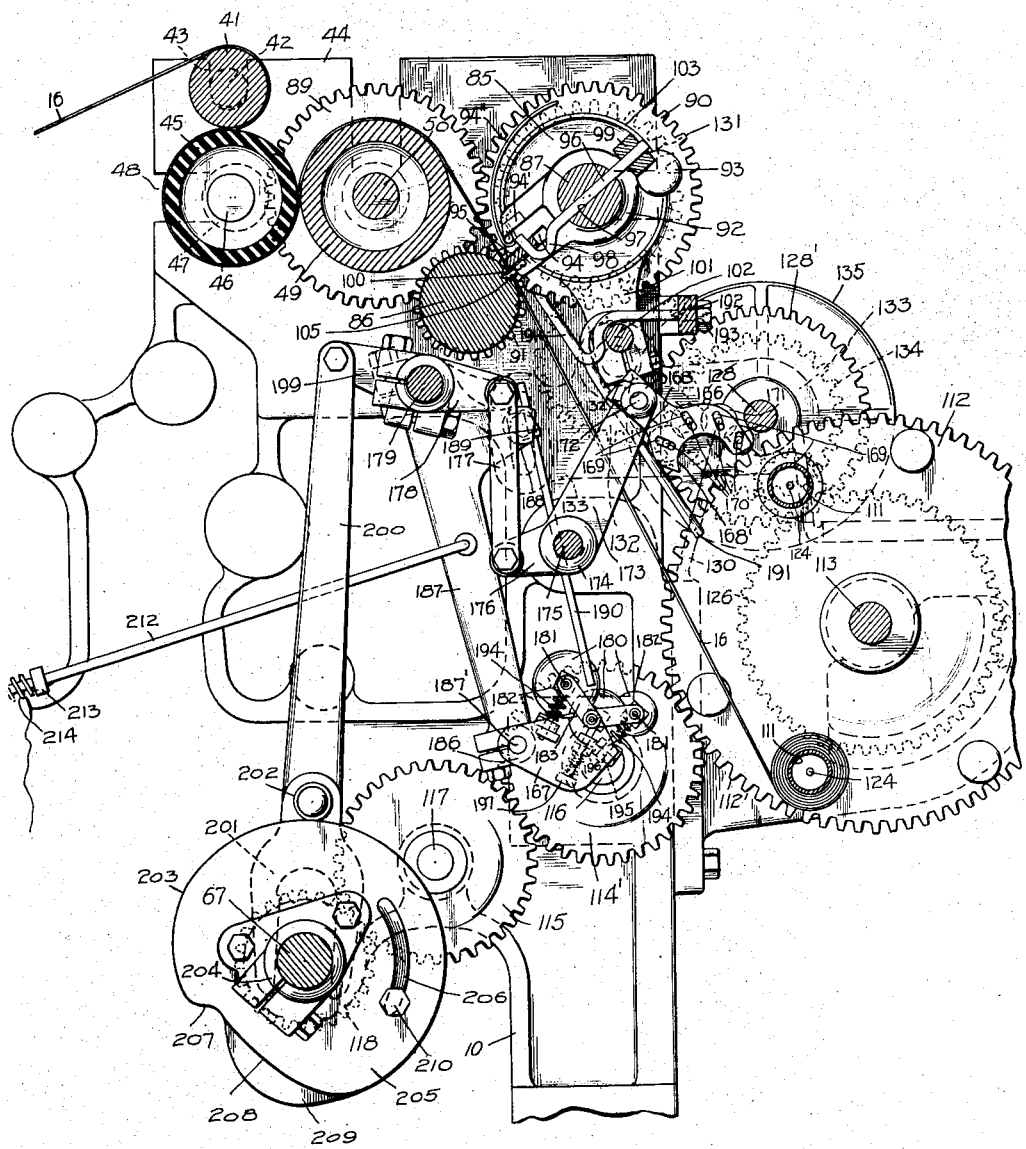

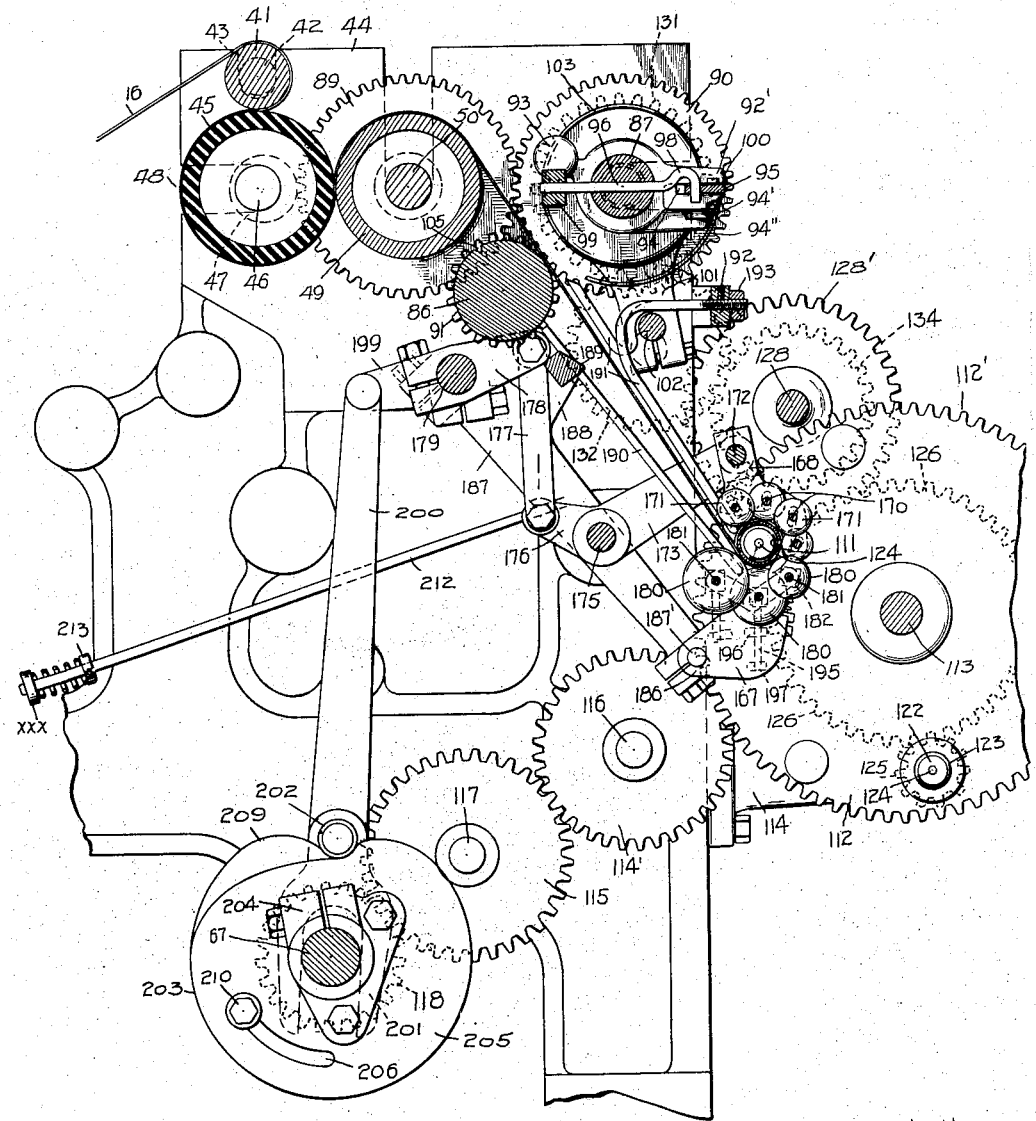

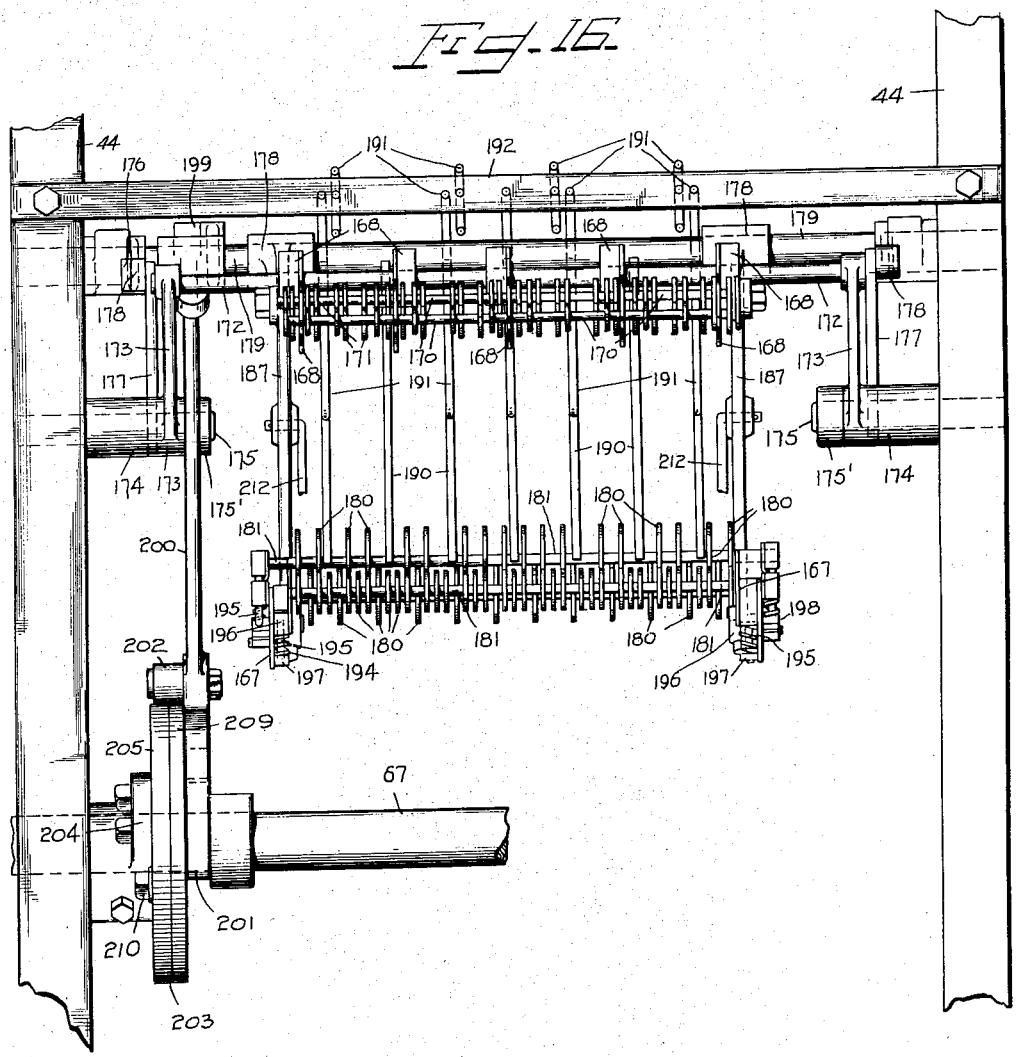

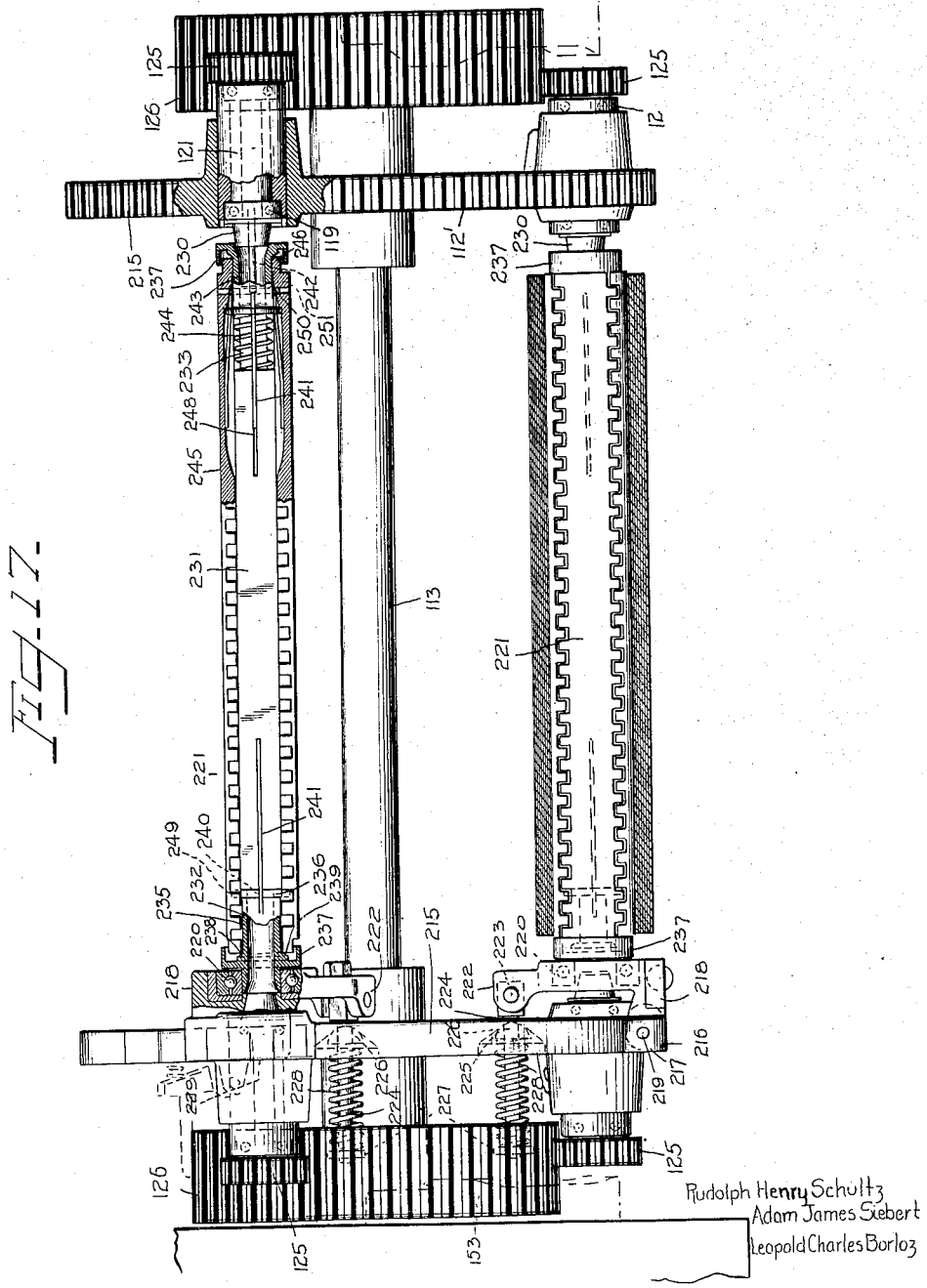

Patented July 17, 1934

1,966,525

UNITED STATES PATENT OFFICE 1,966,525

AUTOMATIC REWINDING MACHINE

Rudolph Henry Schultz and Adam James Siebert, Brooklyn, N. Y., and Leopold Charles Borlox, Teaneck, N. J., assignors to Schultz Engineering Corporation, Brooklyn, N. Y., a corporation of New York Application June 21, 1929, Serial No. 372,770

18 Claims. (Cl. 242—56)

This invention relates to improvements in an automatic rewinding machine designed and fitted for rewinding rolls of paper of varieties better known commercially as sandwich paper, tissue, tabulating and wrapping papers, and the invention has for its primary object to insure greater production than has been practicable heretofore in handling this class of merchandise, and to provide a simple and effective construction and arrangement of parts cooperating to produce the described result.

The invention in its preferred embodiment consists in a power operated machine having instrumentalities for holding and continuously feeding paper from a millroll, means having a plurality of rotary chucks for picking up a cardboard tubular core and cooperating with the feed member for rewinding the paper in rolls of predetermined lengths, combined with a periodically acting cage movable into position relative to the chucks and about the paper for automatically securing the latter to rewind on the succeeding chuck operated core initiatory to the starting of the successive roll. Provision is also made for severing the paper and for withdrawing the chucks to discharge the completed rewound roll from the machine.

The invention further contemplates a plurality of collapsible tubes through the medium of which successive rolls of the paper are rewound without the use of cardboard tubes as cores and the completed roll discharged during continued operation of the machine.

Figure 1 is a side elevational view of my improved automatic rewind machine; Figure 2 is a top plan view of the same; Figure 3 is a front elevational view of the invention illustrated on a slightly larger scale; Figure 4 is a side elevational view of the same showing reel and associated parts; Figure 5 is a substantially front elevational view of the hopper, carrier reel and friction drive therefor; Figure 6 is a substantially transverse sectional view of the carrier reel and hopper; Figure 7 is a substantially longitudinal sectional view of a chuck, its support and means for operating the same, the view being taken on lines 7—7 of Figure 6; Figures 8, 9 and 10, are detail elevational views of the tube chucks and control cam therefor in the three steps which constitute the full cycle of operation; Figure 11 is a plan view of the means embodied in the machine for severing the paper web subsequent to predetermined amounts having been rewound in separate rolls; Figure 12 is a front elevational view of the same; Figure 13 is a side elevational view of the cutting means and the mechanisms for effecting its operation; Figure 14 is a longitudinal sectional view of the front end of the machine showing the carrier reel and feed rolls in section, and the cage and associated parts in side elevation, the cage being illustrated in open position; Figure 15 is a similar view showing the cage in section and in closed position initiatory to starting a new roll; Figure 16 is a front elevational view of the cage in open position; and Figure 17 is a front elevational view of the carrier reel equipped with collapsible cores.

Referring to the drawings and particularly to Figures 1 and 2, 10 denotes the upright columns of the side frames and 11 the top cross bar between the upper ends of each pair of columns, the latter being spaced apart adjacent their lower ends by a second cross bar 12. The rear columns of the side frames are provided with rearwardly projecting brackets 13 disposed substantially midway of the height of the frames and provided with alined open ended bearings 14 to receive the supporting shaft 15 which carries the millroll of paper or other material 16 to be rewound in smaller rolls in accordance with the present invention.

*Mill roll and friction adjustment thereof*

The millroll 16 at the beginning of a run, is naturally very large and requires a certain amount of friction to be applied to it, so that as the speed of the machine slows down for the starting of a new rewind roll hereinafter described, the millroll will not run ahead. Without the friction device, the millroll would run ahead and as the machine again picks up speed, the slack in the paper would be taken up with a jerk and the web broken. The friction device is further utilized to adjust tension for the various weights of paper. It has been found that if too much tension is applied on light papers, it will cause wrinkles to form as the paper passes to the feed mechanism.

To take car of this condition and to facilitate control thereof, a friction device is embodied in the construction of the rewinding machine and comprises a drum 17 fixed on one end of the shaft 15 outside the bearing 14. Friction is applied to the surface of the drum 17 by means of clamp members 18 which are pivotally connected to each other and mounted on a post 18' projecting outwardly from an adjacent portion of the bracket 13 forwardly of the axis of the shaft 15. The mid portion of each clamp member 18 is provided with a semi-circular shoe portion 19 embracing the drum 17. Beyond the shoe 19 in each case is a yoke shaped projection 20, the latter of the lower clamp carrying a pin 21 between its arms and projecting through the eye 22 of a clamping bolt 23. The free threaded end of the bolt 23 swings upwardly about the pin 21 and between the arms of the upper yoke and carries a washer 24 which is yieldably urged against the yoke by a coiled spring 25 embracing the bolt 23 and having its tension adjusted by means of a hand wheel 26 on the free end of the bolt 23.

In conditions where the mill roll is not properly centered on the shaft 15, the latter may be shifted axially thereof through the friction device. The inner end of the post 18' is threaded and adjustable axially in its mounting in the bracket 13, the adjustment being effected by a crank handle 27 carried by the outer end of the post beyond the clamp members 18, as illustrated particularly in Figure 2. The clamp members themselves are held in juxtaposed position on the post 18' by the crank handle 27 on one side and a collar 28 on the opposite or inner side, and axial movement is imparted to the drum 17, shaft 15 and millroll 16 by flanges 29 projecting beyond the friction surface at opposite sides thereof to be engaged by the opposite sides of the shoes 19.

The shaft 15 carries its millrolls 16 by an arrangement comprising a pair of hexagon paper roll chucks 30, each of which is bored to fit the shaft 15 and is disposed with its taper in the direction of the center of the machine, that is to say, towards the other chuck. The shaft 15 is slightly increased in diameter at the portion 31, which is disposed between the brackets 13, and at the end having the friction device, this enlarged portion 31 is provided with a flat surface 32, which accommodates a similar surface in the bore of chuck 30 and thereby imparts the rotary movement of the roll 16 to the shaft. Various widths of paper are accommodated by the chuck 30 at the other side of the roll 16, the chuck being adjustable over a threaded portion 33 of the shaft 15 by means of a hand wheel 34, which moves over the threads 33 and against the outer end of the chuck.

From the millroll 16 the paper is threaded upwardly and about a tension roller or take-up roller 35 projecting between the upper ends of the rear columns 10 and mounted at its ends in sliding block bearings 36, which are guided over tracks 37 disposed longitudinally of and arranged on the inside of pairs of jaws 38 forming part of the side frames. A plate 39 is fixed over the open end of each pair of jaws 38 and at the inner end thereof a compression spring 40 is mounted to yieldably urge the bearing block 36 outwardly against the paper running thereover to the feed mechanism.

*Feed and measuring mechanism*

Referring now particularly to Figures 14 and 15, the paper from the roller 35 feeds forward in an upwardly direction to an idler roller 41, which is provided with oppositely projecting stud shafts 42 loosely mounted in slots 43 disposed in the upper ends of upstanding side plates 44 integral with the forward ends of the side frames. Directly under the roller 41 is a second rubber covered driven roller 45 of greater diameter than 41 and provided with stud shafts 46 which turn in eccentric bearing blocks 47 mounted in the plates 44. The bearing blocks 47 are arranged in position and the shafts 46 project through horizontal slots 48 cut into the rear upright sides of the plates 44. The paper passing around the idler roller 41 follows the latter over its surface to the under driven roller 45 and thence three-quarters of the way around the latter to a point between it and a driven roller 49. The tension of the paper about the first two rolls is effected by the weight of roller 41 directed towards the driven roller 45 and further between the latter and the driven roller 49 by adjustment of the eccentric bearings 47 to adjust the second driven roller in the direction of the driven roller 49. The driven roller 49 is a cylindrical member closed at both ends and provided with hubs to receive and turn with a rotary shaft 50, the latter being the main shaft for imparting movement to all driven parts of the machine. At one end of the shaft 50 are mounted a tight pulley 51 and loose pulley 52, see Figure 2. A belt 53 capable of being shifted at one end from one pulley to the other, is driven at the other end by pulley 54 on a shaft 55 of an electric motor 56, the latter being supported upon brackets 57' secured to and projecting between the lower cross bars 12 of the side frames 10. Each revolution of the rubber covered roller 45 and roller 49, the latter being certain diameters, measures a fixed amount of paper.

*Automatic belt shifter*

At a point in the travel of one strand of the belt 53, illustrated in Figures 1 and 3, the latter runs between the projecting fingers 57 of a belt shifting rod 58, which is mounted in the plate 44 on the pulley side of the machine and is operated axially of itself, projecting inside the plate 44 and having at its end, a pin 60. The pin 60 is accommodated in a slot 59 at the upper end of a rocking lever 61, the other or lower end of the latter being pivoted on a stud shaft 62 fixed in bracket 63 which is mounted on the frame 10 of the pulley side of the machine. A coiled spring 58' embracing the rod 58, is disposed between the outside of the plate 44 and inside finger 57, whereby the normal tendency of the rod 58 is to yieldably urge the belt 53 in the direction of the loose or outside pulley 52. The rocking lever 61 is further provided with an arm 64 projecting inwardly from the pulley side and carrying at its end a cam roller follower 65, which is yieldably held, through the action of spring 58', in engagement with a plate cam 66 mounted on and turning with the main cam shaft 67 of the machine.

The plate cam 66 is arranged between the frames 10 adjacent the pulley side of the machine and comprises a clamp hub 67" which clamps onto the cam shaft 67. The plate cam 66 is further provided with tapped holes accommodating clamp bolt 67' which projects into the arcuate slot of a second plate cam 68. Relative adjustment of the second cam 68 effects the period of movement of the follower 65, arm 64 etc., to cause the belt 53 to ride on the loose pulley 52 for a longer or shorter period of time and thus automatically regulate the slowing down and speeding up of the machine operation. The clamp hub 67" carrying the cam plate 66 is so arranged that simultaneously with the wrapping of the leading end of the paper about a tube in position for a new roll as hereinafter described, the belt 53 will start shifting to the tight pulley 51 to bring the machine up to speed. The cam plate 68 is then adjusted so that when the roll is completely wound, the machine slows down sufficiently to allow the leading end of the paper to start around the next tube now in position. The speed regulation just described is variable according to the grade of paper to be rewound. A stiff heavy paper will handle, in the transfer onto a new tube, very much more satisfactorily at a high rate of speed than will a paper of a lighter grade. A light weight paper transferring at a high rate of speed has a tendency to buckle before reaching the tube; therefore, the speed must be reduced to allow the paper to come down between the guides without buckling. The plate cam can also be so adjusted that the machine does not slow down. It all depends on the paper being run and the speed of the machine proper itself.

Drive for cam shaft

The cam shaft 67 is driven through a chain of gears arranged on the outside of the machine opposite to that occupied by the pulley wheels 51 and 52, illustrated in Figures 1 and 4. The drive comprises a miter gear 69, mounted on the main shaft 50, between the frame and a hand wheel 70, and in mesh with a similar miter gear 71 fixed to an upright shaft 72 turning in its bearing 73 arranged on the plate 44 directly below the main shaft 50. Below the bearing 73 and fixed to the end of the upright shaft 72 is a worm 74 in mesh with a worm gear 75 loosely mounted on a fixed stud shaft 76 projecting from the hand wheel side of the frame, at a point rearwardly of the vertical axis of the worm 74. Pivotally mounted on the stud shaft 76 is a swinging triangularly shaped plate 77 comprising angularly disposed arms carrying at their outer ends a curved rim 78, which is provided with an elongated slot 79 at its upper end concentric with the axis of the stud shaft 76, and to which at its lower end, forming the third angle, an intermediate spur gear 80 is mounted, the latter being in mesh with a smaller spur gear 81 forming an integral part of the worm gear 75. The slot 79 receives the end of a clamp screw 82 fixed in the side plate 44, as illustratively exemplified in Figure 4. The purpose of the swinging plate 77 is to accommodate various size change gears 83, which mesh with the intermediate gear 80, and which are each provided with a clamp hub 84 fastened to the cam shaft 67. The relative size of the change gear 83 determines the length of roll to be wound and in order to accommodate the various change gears, the clamp 82 is loosened and the swinging plate 77 adjusted until the intermediate gear 80 is in mesh with the change gear 83 on the cam shaft 67.

Cut off mechanism and cam therefor

The paper web being fed leaves the feed roller 49 and passes downwardly and forwardly to be wound directly on the awaiting tubes, as hereinafter described. Between the tubes and roller 49, as clearly illustrated in Figures 14 and 15, the path of the paper is directed between a knife cylinder 85 and female knife roll 86, the former comprising a shaft 87 turning adjacent opposite ends in bearings 88, see Figure 11, in the side plates 44 on an elevation corresponding to that common to the feed rollers 45 and 49, see Figures 11 and 13. The drive shaft 50 is provided with a spur gear 89 between the end of the roller 49 and adjacent the inside of the plate 44. The gear 89 being of a relatively narrow gauge and meshing with a spur gear 90 of a much wider gauge mounted on the knife cylinder shaft 87. The adjacent end of the female knife roller 86 is provided with a small spur gear 91 operating inside the gear 89 and in mesh with the gear 90.

Referring now to the knife cylinder 85, illustrated in detail in Figures 11 to 15 inclusive, the same comprises a pair of brackets 92, each thereof having a hub portion fixed on the shaft 87 and provided with oppositely projecting radially disposed arms 92', one thereof terminating in a weighted end 93 and the other arm 94 having its end slotted transversely and parallel with the axis of the shaft 87. The brackets 92 are spaced apart on the shaft 87 so as to bring their outer ends just inside the ends of the feed roll 49 and female knife roll 86. The slotted ends of the arms 94 accommodate a radially adjustable knife bar 95 adjacent its ends, the bar being further guided in the slots of arms 94 by means of a pair of spaced rods 96, each thereof projecting transversely of the shaft 87 through a bore 97 drilled diametrically therethrough. One end of each rod 96 is provided with a hook 98 which is engaged in an opening in the bar 95 adjacent the rear side thereof. The opposite ends of the rods 96 carry a weight in the form of a straight bar 99. To the under portions of the arms 94 is fastened bar 94' which supports curved stripper fingers 94'' for the purpose of preventing the web at its end from becoming engaged with the knife during rotation of the knife cylinder 85. The cutting operation is effected by a serrated knife blade 100 detachably carried by one face of the bar 95 and in normal position the keen edge projects slightly beyond the free ends of the arms 92', the ends thereof being beveled outwardly towards each other and the cutting edge of the blade 100. The purpose of the weight 99 is to properly balance the cutting device when the knife cylinder has attained its full rotary speed. If no weight were used the centrifugal force accumulated in the bar during rotary movement would tend to project the latter outwardly into cutting position, during its entire rotary movement, which cutting position, according to the present invention, is only brought about after predetermined lengths of the paper have been rewound.

The mechanism for bringing the knife 100 into projected or cutting position, comprises a pair of arms 101, each thereof being clamped at one end to a rock shaft 102 projecting between the plates 44 of the side frames 10. The arms are arranged on the shaft 102 so as to bring their outer free ends in positions just beyond the paths of rotary movement of the brackets 92, the outer ends of the arms 101 being annular and disposed loosely about the knife cylinder shaft 87. The inside of each annular portion of the arm 101 carries an annular flange 103 adapted to be held normally in position concentric with the axis of the shaft 87, the free ends of each flange 103 projecting into and through a longitudinally disposed open ended slot 104 in the adjacent end of the knife bar 95, as shown in Figure 11. To project the knife bar 95 and the knife 100, the rock shaft 102 is turned on its axis in a counterclockwise direction, as viewed in Figures 14 and 15, which movement causes the annular ends of the arms 101 to swing towards the female knife roller 86 in the position illustrated in Figure 14. The offset movement of the knife is very rapid and occurs simultaneously with the knife 100 being brought into position directly over the surface of the female knife roller 86, the latter being provided with a longitudinally extending V-shaped groove 105, see Figure 14, into which the edge of the knife 100 is projected to sever the web.

The rock shaft 102 is oscillated through a connection illustrated in Figure 13, and comprising an arm 106 clamped at one end to the shaft 102 outside the frame 10 on the hand wheel side thereof. The outer end of the arm 106 carries one end of a link 107, the opposite end thereof being connected to a lever 108 pivotally mounted on the side of the frame 10 directly above the center of the cam shaft 67, see Figure 4. The lever 108 between its ends carries a downwardly depending toe 109 which is adjustable and is engaged by a lifting arm 110 clamped at one end to the hub of the change gear 83, see Figure 3. For each complete revolution of the cam shaft 67 and change gear 83, the arm 110 engages the toe of the lever 108 to lift it and with it the link 107, resulting in a partial rotation of the rock shaft 102 and offset of the knife cylinder rings or flanges 103. The offset positions of the rings 103 project the knife bar 95 and knife 100 simultaneously with the groove 105 of the female roller 86 having reached the common tangent line of the roller and circular path described by the knife itself, the knife being projected at the said point so as to cut through the paper and enter the groove 105 and then instantly withdrawn as the toe of the lever 108 drops from the passing lifting arm 110.

*Tube carrier reel and hopper*

The paper from the feed roller 49 travels in a downward and forward direction and rests lightly upon the surface of the female knife roller 86 to be picked up by a cage, hereinafter described, and wound upon a revolving tube 111, see Figures 14 and 15, which is one of a number being carried by a carrier reel, wound with paper and finally discharged, and which comprises an ordinary cardboard tube used as a core for roll paper of almost any of the varieties being dispensed in rolls.

The carrier reel comprises a pair of spaced cheek plates 112 in the form of discs which are both fixed on a reel shaft 113, the latter having its bearings in brackets 114 arranged on the forward ends of the frames 10, as illustratively exemplified in Figure 6. One of the discs 112, preferably the one adjacent the belt side of the frames 10, is provided on its periphery with teeth 112' which mesh with one of two intermediate gears 114' and 115 arranged on stud shafts 116 and 117, respectively, projecting from the inner side of the frame 10, the gear 115 being in mesh with a gear 118 on the cam shaft 67. It is to be noted therefore, that the reel proper receives its rotary movement through the gear connection with the cam shaft 67.

Referring now to Figures 6, 7, 8, 9 and 10, the discs 112 carry a plurality of chucks, in the present instance, three, each of which comprises a rotary spindle 119 projecting axially of the disc, adjacent the periphery thereof, and supported in ball bearings 120, the latter being arranged in the opposite ends of a bearing sleeve 121 which is slidably mounted in a boss projecting from opposite faces of the disc. The inner end of the spindle 119 carries a cylindrical collar 122 terminating at its free end in a reduced portion 123 provided with a tapered end. The spindle 119 beyond the taper 123 is pointed, as illustrated in Figure 7. The opposite end of the spindle 119 is provided with a planetary gear 125 meshing with a sun gear 126 loosely mounted on a sleeve 127 on the reel shaft 113 and being driven in a direction opposite that taken by the reel, see Figure 5. Such a sun gear 126 is arranged at each side of the machine between the side frames and the adjacent disc 112, and both gears are driven by gears 128' keyed to the adjacent ends of a rewind friction drive shaft 128, the latter projecting through bearing sleeves 129 in brackets attached to the forward ends of the plates 44.

The purpose of the rewind friction drive is to regulate the rewind tension on the rolls on the delivery end of the machine. It has been found that where too much tension is applied to the rewind and where very flimsy tubes are being used, the tubes will pull out of the rewind chucks. Wrinkles appearing in the paper being rewound is another indication that too much friction is being applied. Quite the contrary is the condition where relatively heavy papers are being run, the latter requiring the use of considerable tension to secure a tightly wound roll. To take care of such varying conditions, suitable mechanism is embodied in the machine and one embodiment of such mechanism is illustrated in Figures 2 and 5.

The drive for the friction rewind is arranged on the outside of the pulley side of the machine and comprises a spur drive gear 131 which is also a change gear, fixed on the end of the knife cylinder shaft 87, the movement of the latter being transmitted through an intermediate gear 132, see Figure 14, which is carried on an adjustable plate 133 pivoted on the sleeve 129 of the friction drive rewind shaft 128. A gear 134, mounted on the sleeve 129 adjacent the plate 133, is in mesh with the intermediate gear 132 and is fastened to a friction disc 135, see Figure 5. Engaged with the first friction disc 135, through a clutch lining 135', is a second disc 136 slidably mounted on the shaft 128, through a key connection 137, the lining 135' being a loose ring in frictional contact with both discs. Yieldably urging the second disc 136 into frictional engagement with the first is a two part coiled spring 138 disposed about a friction screw stud 139 which projects against the end of the shaft 128 at one end and is supported in a bracket 140 at the other end. One end of the spring 138 bears against a thrust bearing and this in turn against the hub of the disc 136 and at the opposite end is engaged by the hub of a hand wheel 141 which is adjustable over the threads of the stud 139.

A friction cam is carried on the outer end of the carrier reel shaft 113. A cam comprises a flanged hub 142 carrying three balls 143 on its outer surface. In the closed position of the cage for starting the leading end of the paper onto a tube, as hereinafter described, one of the balls 143 will have been mounted by a ball 144 carried adjacent one end of a bar 145, the latter being pivoted to the bracket 140 and having its upper or opposite end forked to engage in between the parts of the spring 138. The action of the bar 145 is to exert pressure against the heavy friction spring 138 while the spring in turn, exerts pressure against the thrust bearing and friction discs driving the rewind chucks. The hub 142 is provided with a clamp which may be loosened to allow adjustment of the hub over the shaft 113 to increase or decrease pressure as desired.

It will be noticed that the plurality of chucks contained in the carrier reel discs are driven through the friction discs 135 and 136. Therefore, as the web is being wound on a core to a predetermined length and then cut off, the slip between the friction discs 135 and 136 increases as the wound roll becomes larger in size. At the same time, the incoming core, that is to wind the leading end of the cut web after the preceding roll has been finished, is constantly slowing up and running at less than the incoming paper speed. At the point of cutoff of the web, the cam 142 comes into operation as explained in previous paragraph, and the slip between the friction discs is reduced almost instantaneously, and the incoming core speeded up to a trifle faster than paper speed, in order for the web to wind properly. The in and out adjustment of the cam therefor, must be varied with the size of the roll wound. More pressure being required to speed up the tube immediately after the preceding roll is wound to a predetermined length and cutoff than the roll being wound receives through the hand wheel adjustment 141, which is just for tensioning paper to produce a hard or soft wound roll.

Referring again to the change gears for the rewind friction drive, it is pointed out that when cores of different diameters are used for rewinding, it is necessary to change the size of the drive gear 131 on the knife cylinder shaft 87 and to adjust the swinging plate 133 so as to bring the intermediate gear 132 into mesh with the drive gear 131. The purpose of utilizing different size drive gears 131 is explained as follows: Assuming the gearing is figured out to drive an inch and one quarter diameter core or tube at slightly faster speed than the paper speed and then with the same gearing, an inch and three quarters diameter core is inserted to receive a winding, the initial slip will be so great, as a result, that the roll will not wind evenly. It is to be noted that the use of gears of different sizes will give the correct speed for rewinding.

The bearing sleeve 121 in each chuck receives its axial movement by means of an arm 146 pivoted substantially midway of its length on a pin 147 supported between ears 148 projecting from the outside face of the carrier reel disc 112, as illustratively exemplified in Figures 6 and 7. One end of the arm 146 projects in the direction of the chuck and is provided with a pin projection 149, which describes an arc during its movement and projects through a slot 150 cut in the side of the outside portion of the boss carrying the sleeve 121 and into an opening in the latter. The opposite end of the arm 146 is normally forced outwardly from the face of the reel disc 112 by pressure exerted from a spring 151, the latter being seated at one end in a well 152' disposed in the disc 112 and at the other end against the under side of the arm itself. Each arm 146 during a certain arc of its travel with the reel disc 112 is rocked against the pressure of its spring 151 to withdraw the cylindrical bearing 121 and with it of course, the spindle 119 from the inside face of the reel disc 112, to first release the end of a tube and thereafter to pick up another from a hopper hereinafter described. Rocking movement of the arm 146 is effected by the engagement of a projecting pin follower 152 disposed outwardly from top of the arm at the spring end thereof, with a cam 153, one thereof being carried on the inside face of each bracket 114. Each cam 153 is arcuate in shape and projects lengthwise and concentrically of the axis of the path traversed by the chuck spindles and associated parts from a point beyond the upright lower radius to another point above the horizontal radius projecting from the axis of the reel towards the front of the machine. In other words, with the reel rotating in a counterclockwise direction, each cam 153 is effective over a distance greater than and including the last quarter of one cycle. The effective surface of each cam 153 is arranged in three steps; the first 154 is the lowest and constitutes the approach which successively receives the ends of the pin followers 152 in their outermost position; the second step 155, beginning at a point forward of the lower upright radius throws the follower inwardly and rocks the arm 146 and pin 149 to withdraw the chuck a distance equal to slightly more than the axial length of the portion 123 and bevel tip 124 of the sleeve 122. The purpose of this step is to release both ends of the tube or core, letting the same drop off center and then be caught by the tapered ends of the spindles 119. At this point, the roll being wound will have been rotating at high speed and its release from the rotating spindle will give it sufficient time in which to reduce its speed while hanging upon the tapered ends of the spindles. The final and highest step 156 of the cam causes the complete withdrawal of even the tapered end of the spindle 119 from the support of the tube which as a consequence, falls from the carrier reel. A continuous blanket 157, illustrated particularly in Figures 1 and 6, is suspended at one end from the carrier reel shaft 113 and the opposite end projects downwardly to an elevation substantially below that occupied by the roll when the latter is finally released so that contact of the roll with the blanket tends not only to slacken its rotary speed, but actually directs the roll and prevents the same from flying outwardly when the spindles 119 are completely withdrawn.

The third step 156 of each of the cams 153 is of an elevation to constantly hold the spindles in retracted positions until the same have traveled into position to receive a tube from the hopper. The three positions of a spindle and tube associated therewith are illustratively exemplified in Figures 8, 9 and 10.

Referring now to the hopper, illustrated particularly in Figures 2 and 6, the latter comprises a pair of spaced bottom rails 158 arranged just inside of inner ends of the chucks when the latter are in their extended position. Each bottom rail 158 is made of a narrow strip of metal, which is bent L-shaped, and which is disposed with its longer arm supported at an inclination upwardly and forwardly, so that the center of the cores are along a radial line from the center or axis of the carrier reel. The inner end of each rail projects to a point coincident with a line tangent to the innermost point on the periphery of the chuck when the latter is in its receiving position, as shown in Figure 6. The perpendicular stop portion 159 of the rail 158 projects upwardly along the said tangent line to a point substantially above the center or axis of the adjacent chuck. It will be clear now that when the tubes are arranged successively one after the other in the hopper, the lowermost tube will be supported at a point which brings its axis coaxial with the axes of the chucks on opposite sides of the machine. At the position where the three said axes coincide, the pins 152 will have just dropped from the cam surfaces 156 permitting the chucks to pick up the tube and carry it upwardly out of the hopper. The rails 158 are fastened to cross bar 158' and this in turn to angle pieces 162. The hopper further comprises a top guide 160 supported over and in spaced relation to each bottom rail 158 and fastened to side guide pieces 161. The side pieces 161 are adjustably mounted on cross bar 158' so as to allow for slight variations in the lengths of the cores or tubes as well as to facilitate movement thereof of their own weight toward the lower or delivery end of the hopper. The bottom rails 158 and top pieces 160 likewise receive their support from the brackets 162 which comprise angle bars, one arm of which is attached to the reel supporting frame and the other to the cross bar 158'. Suitable adjustment of the hopper is necessary so that its height will bring the various size cores or tubes to be taken by the chucks in line with the center thereof. For this purpose, the arms of the brackets 162 are provided with slots to receive the stem portions of bolts 163 carried by the cross bar 158' of the hopper, further adjustment being also secured by moving angle pieces 162 up and down on brackets 114 by means of slots in the angle pieces.

Thus far, the present invention has been described as consisting of a suitable frame in which the mill-roll and friction adjustment therefor are supported, a feed mechanism cooperating with the millroll to feed a web of paper to the rewind station, an automatic belt shifting device functioning to regulate the slowing down and speeding up of the machine to successfully carry out other operations, a drive for the cam shaft and the cut-off mechanism whereby the web is severed when each rewind roll is completed; a tube carrying reel and a hopper therefor; and it now remains to describe the cage and operation thereof to start the leading end of the paper web onto a new tube as the latter moves into winding position.

*Cages and cam drive therefor*

In accordance with the embodiment of the invention illustrated in the drawings, three sets of chucks are utilized in the reel carrier, and each set of chucks operates through three stages to complete one full revolution; the first—the stage which includes the picking of a tube from the hopper and carrying it to a position where it approaches the second stage, whereupon the leading end of the paper web is picked up by the cage and started on its winding operation; and third—the stage in which the full wound roll of paper is released and discharged from the carrying reel.

The mechanism for picking up the leading end of the web and starting it on a new tubular core is referred to as a cage, and the details and operation thereof are illustratively exemplified in Figures 14, 15 and 16.

The cage comprises an upper jaw 166 and a lower jaw 167 which move towards and away from each other about the axis of the tube during its position at the beginning of the second stage in the rotary movement of the reel carrier, as illustrated in Figure 15. The upper jaw 166 comprises a plurality of spaced arms 168, each thereof having a claw shaped free end 168' provided with an inner periphery slightly greater in diameter than the diameter of the tubular core receiving the rewind and of a length to embrace substantially one-half the periphery of the tube as shown when the cage is closed. The claw ends 168' are provided wtih a number of slots 169, in the present instance, four slots, projecting at different angles and adapted to receive rod shafts 170 which are free to rotate and move in their respective slots relatively to the tubular core. The outside dimensions of the shafts 170 are slightly greater than that of the width of paper being rewound and between the arms 168. The discs 171 are mounted on the shafts 170 to engage the leading end of the web throughout its width against the tube, the discs being preferably of a fibre construction.

The arms 168 of the upper jaw 166 are fixed on and carried by a shaft 172 which receives its support adjacent its opposite ends in the longer forwardly projecting arms 173 of bell crank levers 174. The levers 174 operate adjacent the side frames and are rotatably mounted on stud shafts 175 projecting from the inner faces of the said frames 44, as illustrated in Figure 16. The hub of each bell crank 174 abuts at its outer end against the frame 44. Bell crank lever 174 is prevented from coming off stud shaft 175 by a collar 175', and is also provided with a shorter and rearwardly disposed arm 176. A separate link connection 177 is pivoted at its lower end to each arm 176 and at its upper end is pivoted to one end of a lever arm 178 which is clamped to a rock shaft 179 mounted in bearings in the opposite walls 44 of the frames 10. As illustrated in Figures 14 and 15, it will be clear that oscillatory movement of the shaft 179 will cause the jaw 166 to move from open position to closed position and vice versa.

Before the leading end of the web reaches the upper discs 171, the end is picked up by a lower series of fibre discs 180 which interlock with the discs 171, and feed with the rotating tubular core under the upper discs 171. The lower discs 180 are supported in spaced relation to each other and to the upper discs 171 on three shafts 181. The shafts 181 are carried in bearing blocks 182, two thereof being arranged at the free ends of angularly disposed arms 183 while the third or center block is carried on triangular plate 186. The arms 183 carrying the two end bearing blocks 182 are pivotally mounted on pin 148 arranged on the outer side of lower jaw 167, comprising a triangular plate 186, which is riveted to stud 187'. This in turn is clamped to a downwardly disposed lever arm 187, one thereof being arranged at opposite sides of the machine, see Figures 14 and 16. The lever arms 187 are substantially long members which are clamped at their upper ends to the rock shaft 179 inside the field of operation of the arms 173 of the upper jaw 166. The lever arms 187 are each provided on their forward side and adjacent the upper end with a projection 188, the latter being utilized to carry one end of a buss bar 189, which carries a plurality of spaced wire guide fingers 190, and which moves through a short arc with the lever arms 187. The wire guide fingers 190 are perfectly straight lengths of relatively stiff wire and are each of a length to project from a point adjacent the periphery of the female knife roller 86 to a point forward thereof and on a lower elevation, so as to bring the end of the finger just under the surface of the tubular core 111 as it reaches the point beginning the second stage in its travel with the reel and as the cage closes to embrace it, as illustrated in Figure 15. Of course, as illustrated in Figure 14, the fingers 190 move with the lower jaw 167 and rearwardly away from the path of the core. The purpose of the fingers 190 is to prevent the leading end of the web from falling to a vertical position from the periphery of the female knife roller 86 after the knife has severed the web and its leading end continues to feed forward. The leading end of the web is picked up by the fingers 190 and guided to the discs 180 and tubular core 111. Further provision is made to guide the leading end of the web as well as the trailing end thereof, subsequent to the severing operation of the knife. The web may have a tendency to curl upwardly and follow the knife roll, and to prevent this, a plurality of alternating upwardly and downwardly projecting wire stripper fingers 191 are arranged over the path of the web from the female knife roller 86 to the tube receiving the rewind. The fingers 191 are hook shaped members and project through openings in a second buss bar 192 arranged across the front of the machine, as shown in Figures 14 and 15.

Referring again to the interlocking discs 180 of the lower jaw 167, the bearing blocks 182 therefor are supported in yieldable positions relative to the tubular core 111 by means of springs 194, which embrace stem 195 carried by each block 182. The construction of the lower cage with springs 194 holding stop collars 197 against lugs 196 also allows rollers to stay against core and as the reel 112 rotates continuously, the core presses against the lower rollers or discs 180 and compresses the springs 194. This construction allows the leading end of the web to get a start on the core, as carrier reel 112 advances and pushes the core against lower discs 180, compressing springs 194. The lower discs being yieldably held against core 111, prevent same from being pulled from chucks or mutilated. The lower cage opens up before springs are entirely compressed and after the web has its initial wind for new roll.

The timing of the operations of the cage is effected through a connection with the main cam shaft 67 comprising a lever arm 199 clamped at one end to the rock shaft 179 adjacent one end thereof, preferably the hand wheel end. The lever arm 199 projects rearwardly under the driving feed roll cylinder 49 and is pivotally connected at its outer end to the upper end of lever 200 which hangs downwardly and is provided at its lower end with a yoke 201, the arms thereof embracing opposite sides of the cam shaft 67. A follower roller 202 projects from the side of the lever 200 toward the adjacent side frame 10 and at an elevation just above the yoke portion 201. The follower roller 202 rests upon the periphery of a cage cam 203 which comprises two plates and a clamp hub 204, the latter being clamped about the cam shaft 67 as illustratively exemplified in Figures 3, 14, 15 and 16. The outside plate 205 of the cam 203 carries the hub 204 and is provided with a concentric slot 206. The contour of the plate 205 comprises a concentric portion, a sharp drop 207 and a substantial dwell 208. The other plate 209 of the cam 203 is adjustable on the plate 205 by means of a clamp bolt 210 projecting from plate 205 and through the slot 206. The contour of the second plate 209 is similar to the first, except that its position is reversed so that the two drops may be adjusted towards or away from each other leaving the dwell 208 or low portions therebetween. Through this means, the cage jaws are held for a longer or shorter period of time in closed position on the core receiving the rewind, the duration of time the cage is in closed position depending upon the requirements of the paper being wound, and also on the amount of paper on the roll being wound. The rock shaft 179 is yieldably urged to rotate in a counter clockwise direction to close the jaws by means of rods 212, each thereof being hocked at one end in the lever arm 187 and projecting rearwardly of the machine and through a guide block 213 to receive a spring 214, the opposite ends respectively of the spring being engaged against the collar and guide block on the free end of the rod itself.

The reason for holding the cage closed for a longer or shorter time interval is explained by the fact that whenever a heavy stiff paper is being handled, it becomes necessary to get a few initial coils more of the paper wound about the core than is required for a lighter gauge paper. A heavy paper of a stiff grade when the initial coils are too few, will spring away from the core as soon as the cage leaves the latter. If, on the other hand, the cage is operated too long in closed position and a flimsy core is used, the tendency of the carrier reel to advance with the core while the cage is closed, will result in the core being pulled out of its chucks.

As explained heretofore, each revolution of the feed rollers feed a certain amount of paper. The length of the paper to be wound on a roll is determined by the size of the change gear on cam shaft 67. For each revolution of this gear, the cutoff knife operates once through lever 110 fastened to same. It can therefore be seen that as the feed rollers rotate at a fixed speed, relatively, the number of revolutions of the cam shaft will vary in a certain interval of time in proportion to the size of the change gear. It therefore, follows that with a small change gear on cam shaft 67, it will rotate a greater number of times than with a larger one. It also follows that the speed of rotation of the carrier reel discs 112, being driven through gearing from the cam shaft will be greater with a small change gear on the above shaft than with a larger one. Now, if the carrier reel discs rotate faster with a small change gear than with a larger one, the gap or dwell on cam plates holding the cage around the core for starting a new roll, must be varied, in order not to compress the springs on lower cage entirely before the same opens, or as explained previously, the core will be pulled out of chucks or mutilated. It also follows that the smaller the change gear on the cam shaft, the less paper will be on each rewound roll and more rolls in a certain interval of time.

It also follows that with the speed of rotation of the cam shaft varying, this in itself would call for varying the amount of gap or dwell on the cam plates 203, as the gap would be greater with a small change gear on the cam shaft in order to keep the cage around the core for starting a new rewind roll than with a larger change gear, in which case, the cam shaft rotates at a slower speed and the gap or dwell can be reduced.

*Expanding core for carrier reel*

In the production rewound paper rolls of the character described, it may be more economical and efficient to rewind the rolls without the use of the cardboard core 111, and to take care of such a condition, it is contemplated, in accordance with the present invention, to embody in its construction a means whereby the leading end of the web is picked up and coiled by the cage mechanism about a tube, which instead of being a cardboard tubular member forming part of the rewound roll, is a working part of the carrier reel and continues with the other tubes of the same carrier to rewind successive rolls of paper and thereafter to discharge them.

The illustrations of my invention embodying the carrier reel and expanding core, are found in Figure 17. A pair of cheek plates 215 are mounted on the reel shaft 113 to replace the cheek plates 112. Each plate 215 carries its set of chucks and operating means associated therewith, of a construction similar to that described in the foregoing paragraphs relating to the cardboard tube carrier reel and in addition thereto, the plate at the hand wheel side of the machine is provided with three equally spaced peripheral straight portions which are disposed coincident with cords of the circle forming the outer periphery of the plate. Each of the straight portions is bi-sected by a radial line projecting through the axis of a chuck and on opposite sides of the radial line, the material of the plate projects outwardly to the general curve of the periphery of the plate to form a boss 216 which is provided with cutout portions on opposite sides of the radial line to form lugs 217 having a bore therethrough in a direction parallel with the straight peripheral portion of the plate. In the cutouts of each boss 216, the swinging bracket member 218 of a hinge connection is mounted to pivot about a pintle 219 disposed in the bore. The bracket 218 comprises an L-shaped block, the shorter arm being a yoke to hinge on the pintle 219 in the cuts, while the mid portion of the longer arm is substantially disc shaped and provided with a ball bearing 220 to carry one end of an expansible core 221. The outer end of the longer arm beyond the bearing is offset in a direction opposite to the counter clockwise direction of rotation of the cheek plates 215 and is provided with a yoke 222 disposed in the direction of the adjacent cheek plate to accommodate a pin 223 upon which one end of a spindle 224 is pivoted, the mid portion thereof projecting through an opening 225 which is reamed out on the outside face of the plate 215 to receive a hemispherical block 226 slidably mounted on the spindle 224. The outer end of the spindle 224 carries a fixed collar 227 and between the latter and the block 226, a spring 228 is coiled about the spindle to aid in returning the bracket 218 and core 221 to closed position after the discharge of a roll as hereinafter described.

Referring now to the chuck arrangement carried by the cheek plates 215, the spindles 229 of said chucks replacing the spindles 119, are provided at their inner ends with the cone portions 230 of the clutch members adapted to be brought into engagement with the opposite ends of the core 221 for the purpose of rotating in the manner of the cardboard tubular cores 111.

The expanding core 221 comprises a center spindle 231, which is square in transverse section in its mid portion and which terminates at opposite ends in cylindrical stud shafts 232 and 233.

Permanently mounted on the shaft 232 at the hinged end of the core is a sleeve 235 embracing the shaft throughout its length and having a portion projecting beyond the outer end of the shaft to be fixed in the inner ring of the bearing 220 in the bracket 218. The interior of the sleeve beyond the end of the shaft 232 is tapered outwardly to form the female section for the clutch cone 230 when the core is in closed position. The inner end of the sleeve 235 is provided with a flange 236 and the mid portion inside the projection in the bearing is flanged and carries an annular ring 237 spaced from the periphery of the sleeve 235 and projecting toward the mid portion of the core. At the base of the flange carrying the ring 237 and integral with the sleeve 235 is a square portion 238, the inside walls thereof being beveled to provide cam surfaces 239 which are, respectively arranged to correspond in their positions to the four flat sides of the spindle 231. The sectors of the flange 236, which project beyond the sides of the spindle 231, are provided with orifices 240 for the accommodation of springs 241, as hereinafter described.

Referring now to the opposite end of the core 221, which is termed the free end, the stud shaft 233 is possibly somewhat longer than the shaft 232 and at its end it carries a co-axially disposed spindle 242. The sleeve arrangement 243 in this case, while it is identical with sleeve 235, is slidable longitudinally of the shaft 233; and further, the inner flange 236 instead of abutting the end of the square section of the spindle 231, the construction is changed to provide a space therebetween to accommodate a coiled spring 244 which tends normally to project the sleeve outwardly over the shaft. The result of this condition is to bring the conical end of the bore of the sleeve into frictional engagement with the conical end 230 of the spindle 119, when the core is in closed position, as illustratively exemplified in Figure 17.

The portion of each core 221 coming into contact with the paper to be wound, comprises four sector plates 245, one thereof for each flat side of the spindle 229. The plates 245 are substantially the length between the flanges carrying the rings 237 when the core is in closed position and sleeve 243 is in retracted position on the shaft 233. Each plate comprises a straight length of material having a convex outside surface, which cooperates with the other plates to form a complete cylindrical surface, and a flat inner face to lie parallel and in contact, in retracted position, with one side of the square spindle. The longitudinal side edges of the plates 245 are provided with teeth which mesh with the teeth of the adjacent plates and the opposite ends 246 of the latter are reduced on the convex side and slightly beveled to ride inwardly and outwardly on the cam surfaces 239 by relative axial movement of the cone ends 230. The plates 245 are prevented from being extended too far beyond the spindle 231 by the rings 237, which in any position of the plates, overlie the ends 246 thereof. The plates are normally and yieldably drawn towards the spindle 231 by means of spring members 241 which are fixed at their inner ends in slots 248 arranged longitudinally of each flat under surface and in the mid portion thereof at opposite ends of the plate. The free ends of the springs 241 project loosely through the orifices 240 in the flanges 236. The flanges 236 are accommodated adjacent the ends of the plates 245 in transverse slots or grooves 249 which are substantially wider than the corresponding thickness of the flanges 236 themselves for the purpose of permitting the plates during expansion or contraction of the core to ride longitudinally of the flanges.

Sleeve 243 is held against detachment from the shaft 233 by a pin 250 which fixed in the shaft, projects outwardly at opposite sides to engage in the slots 251 disposed in opposite sides of the sleeve 243.

The operation of the expansible core during one cycle thereof is as follows. The core 221 reaching the uppermost position in its revolution with the cheek plates 215, is in closed position, i. e. the opposite ends of the core are in frictional engagement with the cone ends 230 of the spindles 229. The sleeve 243 is projected to its innermost position with a consequent expansion of the sector plates 245. Approaching the position between the jaws of the cages and into proximity of the leading end of the paper web, the jaws close and the web is started on the rotating expanded core. In the present construction, the retraction of the cone end 230 releases the core at opposite ends and likewise permits the sector plates 245 to collapse under tension of the springs 248, thereby freeing the roll of paper from the core. The core however, at this stage is still rotating at a relatively high speed and in order to cut down its momentum, the cone at the free end of the core still supports the end on the spindle 242. The more or less loose support at this end causes the speed of the core to rapidly decrease until it is safe to entirely withdraw the cone 230, whereupon the free end of the core drops or swings outwardly about its hinge connection 219 and against the cushion spring arrangement 228. The downward inclination of the core causes the rewound tube of paper web to slide off as the core passes in its revolution from the second third to the last. The last step is one along the rising third of the cycle which permits the core of its own weight, to swing backwardly to its initial position. The final steps of the cams 153 are then left behind and the rocker arms 146 under their respective springs again project the spindles 119 and cone ends 230 into frictional engagement with the sleeves 235 and 243.

The construction and operation of the machine being substantially that hereinbefore described, its operation will be briefly described in the following. The millroll 16 is placed in position in the machine and the friction adjustment made effective through the manipulation of the clamp members 18 about the drum 17. The paper web from the millroll 16 is threaded upwardly and about the take-up roller 35 and then between the idler 41 and roller 45 to the driven roller 49. Through the operation of the cam shaft 67 and its various cams, the paper web passing between the female roller 86 and knife cylinder 87 is severed after a predetermined run and the leading end of the web is subsequently picked up by the cage mechanism and started on a new core. The core is then speeded up by the operation of the friction drive and a predetermined length of the paper rewound on the core during a portion of its revolution. The instrumentalities for effecting operation in the chucks are then brought into play and the rewound tube and its paper is released and permitted to drop. Following the discharge of the completed roll, the chucks travel in an upward direction and pick up an empty tube from the hopper; then having moved beyond the cams 153 at the point in the hopper, the chucks are released and fall inwardly to grip the ends of the tube. The new tube moves of course, with the cheek plates 112 in their revolving movement until the cage jaws again move to closed position over the leading end of the next length of the web.

As the invention hereinbefore set forth is illustrated as being applicable to paper rewind machinery, it will be clear that the same mechanisms may be utilized for rewinding other materials with equal facility and efficiency, and it is not the intention to limit the usefulness of the invention to any particular field or material.

Having now described our invention and the manner in which the same operates, what we claim and desire to secure by Letters Patent, is:

1. In a rewind machine of the character described, the combination of means for holding and continuously feeding a web of material from a mill roll, carrying cores and cooperating with the continuously feeding means for rewinding the length of the web on said cores, means for severing the web at the point where the core has received its allotted amount, means for caging the advancing and leading end of the web about the succeeding core initiatory to the starting of a new roll, and means for reducing the speed during the caging of the leading end about the new core.

2. In a rewind machine of the character described, the combination with continuously operating web feeding means of a continuously operating chuck carrier reel adapted to carry rotary driven cores being fed with the web from said means, a severing device operating between the feeding means and carrier reel to sever the web, a cage operating to start the advancing and leading end of the web initiatory to the starting of a new roll, power driving means for continuously rotating the carrier reel and feeding means, cam means driven from the driving means for respectively operating the severing device subsequent to a predetermined run of the web, bringing the cage into position to start the leading end of the web about a succeeding core, and means for disconnecting the driving means to reduce the speed of the machine while the severing device is separating the web and subsequently connecting the driving means simultaneously with the closing of the cage about the core.

3. In a rewinding machine of the character described, the combination of continuously operating feeding means for drawing a web from a mill roll, a severing device for severing the moving web, an automatic core carrier for carrying rotary cores to receive the web, driving means to operate the feeding means, severing device and core carrier, means for reducing the speed of the machine simultaneously with the operation of the severing device to separate the web, and an adjustable frictional connection between the driving means and the rotary cores to regulate the tension of the web being wound on the core.

4. In a rewinding machine of the character described, the combination of a continuously operating feeding device for drawing the web in a continuous length from a mill roll, and a core carrier comprising rotary driven chucks to receive tubular cores therebetween about which the web is rewound from the feeding device, means for caging the leading end of the web, means for withdrawing the chucks in certain positions of the core carrier to release a roll and subsequently releasing the chucks to embrace the ends of an empty core.

5. In a rewinding machine of the character described, the combination of a continuously operating feeding device for drawing the web in a continuous length from a mill roll, a rotary carrier reel comprising rotary driven chucks adapted to carry the rewind cores, means for withdrawing and projecting the chucks during rotary movement of the reel to release a wound core and subsequently engage an empty core, severing means for the continuously feeding web, caging means for rewinding the leading end of the severed web on the following core, and a hopper for the empty cores having its delivery end supporting a tube in co-alinement with the chucks simultaneously with their release thereof.

6. In a rewinding machine, the combination of a continuously rotating carrier reel, comprising spaced cheek plates, a plurality of chuck members equally spaced from each other and disposed about each plate, means for yieldably projecting the correspondingly positioned chucks towards each other during rotary movement of the reel to engage and carry a tubular core at its ends, means for continuously rotating the chucks in one direction and the carrier reel in the same direction.

7. In a machine for rewinding a constantly feeding web from a mill roll, the combination of an automatically operated core carrier reel to carry rotary tubular cores to receive the web, comprising means for supporting and rotating the tubular cores, and means closing about an empty core in said reel during rotary movement thereof to start the leading end of the web initiatory to starting a new roll.

8. In a machine for rewinding a constantly feeding web from a mill roll, the combination of a core carrier to carry rotary tubular cores to receive the web, comprising means for picking up empty cores, rotating the latter and thereafter discharging the same, and starting means for picking up the leading end of the web and starting the same on an empty rotating core, comprising a pair of jaws movable into position to embrace the core, and guiding means for directing the leading end of the web into a position between the jaws and adjacent the empty core during movement thereof with the carrier.

9. In a machine for rewinding a constantly feeding web from a mill roll, the combination of a core carrier carrying rotating tubular cores to receive the web, means for starting the leading end of the web on each core as the latter approaches and traverses a certain stage in its movement with the carrier, said means comprising a pair of pivotally mounted jaws, cages of rollers carried by said jaws and adapted to move into position to embrace the empty tube and on opposite faces of the leading end of the web to bring the latter into contact with the rotating core initiatory to starting a new roll, and means operating to swing the said jaws into closed position.

10. In a machine for rewinding a constantly feeding web from a mill roll, the combination of a continuously rotating carrier reel carrying continuously rotating tubular cores to receive the web, comprising axially movable chucks to engage, carry and release the cores, and means for moving the chucks in steps and axially thereof during a certain cycle of the rotary movement of the carrier, said chucks being provided with projecting means still projecting into the cores subsequent to being initially released by the chucks proper, whereby the loaded cores hang from the said projecting means in eccentric position with respect to the axis of the chucks to enable the rolls to reduce their momentum before being fully released.

11. In a rewinding machine of the character described, the combination of a continuously operating feeding device for drawing a web in a continuous length from a mill roll, means cooperating with the feeding device for rewinding predetermined amounts of the web, and means for weakening the web after a predetermined amount thereof has been rewound, said last mentioned means comprising a cylinder, a longitudinally disposed and radially adjustable blade, said cylinder and blade being disposed so as to normally rotate past the web, means for projecting said blade while the cylinder is in motion to engage the web, a circular track engaged in each end of the blade, and means engaging the tracks and throwing the latter off center with respect to the axis of the cylinder to project the blade radially during a portion of one revolution thereof.

12. In a rewinding machine of the character described, the combination of a continuously operating feeding device for drawing a web in a continuous length from a mill roll, means cooperating with the feeding device for rewinding predetermined amounts of the web, and means for weakening the web, comprising a cylinder, a longitudinally disposed and radially adjustable blade, and means for projecting said blade while the cylinder is in motion to engage the web, the said cylinder comprising a shaft, spaced brackets therefor having diametrically projecting arms, the latter on one side of the axis being provided with slotted jaws to accommodate the blade, the arms on the opposite side being weighted, rods slidable transversely in said shaft and engaged in the blade at their ends on one side and provided with a weight at the other ends, and said means for projecting the blade comprising a circular track embracing the shaft at opposite ends of the blade and engaging the latter, pivoted arms supporting the tracks, and means for rocking the arms to swing the tracks off center during rotation of the blade to project the same and engage the web.

13. In a rewinding machine of the character described, the combination of means for holding and continuously feeding a web of material from a mill roll, core-carrying rotary means for rewinding the continuously fed web on cores, constantly rotating severing means spaced from the said continuously fed web and normally rotating past the same, control means for the said web and the severing means, said control means bringing the latter in contact with the continuously fed web after a predetermined amount thereof has been rewound, means for discharging the rewound roll and supplying a new core, and a plurality of guiding and engaging means for the web and the new core for rewinding the web thereon.

14. In a rewinding machine of the character described, the combination of means for holding and continuously feeding a web of material from a mill roll, core-carrying rotary means for rewinding the continuously fed web on cores, rotary severing means spaced from the said continuously fed web and normally rotating past the same, means for intermittently bringing the said severing means in contact with the web, web measuring means controlling said severing means, and a plurality of guiding and engaging means adapted to wind the continuously fed web on a new core.

15. In a rewinding machine of the character described, the combination of means for holding and continuously feeding a web of material from a mill roll, core-carrying rotary means for rewinding the continuously fed web on cores, rotary severing means spaced from the said continuously fed web and normally rotating past the same, means for intermittently bringing the said severing means in contact with the web, a plurality of guiding and engaging means adapted to wind the continuously fed web on a new core.

16. In a rewinding machine of the character described, the combination of means for holding and continuously feeding a web of material from a mill roll, core-carrying rotary means for rewinding the continuously fed web on cores, constantly rotary severing means spaced from the said continuously fed web and normally rotating past the same, control means for the said web and the severing means, said control means positively measuring the web and bringing the severing means in contact with the continuously fed web after a predetermined amount thereof has been rewound, further control means for positioning a new core when the web is severed, and guiding and engaging means adapted to wind the continuously fed web on a new core.

17. In a rewinding machine of the character described, the combination of an automatically operated carrier reel including rotary core driving means, guiding and engaging means adapted to encircle a core and engage the web for rewinding thereon, frictional means associated with the rotary core driving means for tensioning the rewinding web and further means for increasing the pressure on the friction means to speed up the rotary core driving means following the completion of each rewind.

18. In a rewinding machine of the character described, the combination of means for holding and continuously feeding a web of material from a mill roll, rotary severing means spaced from the said feeding web and normally rotating past same, automatically operated core carrier for positioning cores, core driving means cooperating with said core carrier for rewinding the web on the cores, positive web measuring means, control means operated by the measuring means for bringing the said severing means in contact with the continuously feeding web, core encircling means, including guiding rollers to wind the web on succeeding cores, friction driven means for tensioning the rewinding web, and means for discharging the completed roll.

RUDOLPH HENRY SCHULTZ.
ADAM JAMES SIEBERT.
LEOPOLD CHARLES BORLOZ.